J. C. KELLY AND C. ENSCOE.
CLUTCH AND BRAKING MECHANISM.
APPLICATION FILED MAY 17, 1919.

1,340,897.

Patented May 25, 1920.

Witness
N. L. Rogers

Inventors
John C. Kelly and Curwin Enscoe,
By Howard S. Smith,
Their Attorney

UNITED STATES PATENT OFFICE.

JOHN C. KELLY AND CURWIN ENSCOE, OF DAYTON, OHIO.

CLUTCH AND BRAKING MECHANISM.

1,340,897.  Specification of Letters Patent.  Patented May 25, 1920.

Application filed May 17, 1919. Serial No. 297,731.

*To all whom it may concern:*

Be it known that we, JOHN C. KELLY and CURWIN ENSCOE, citizens of the United States, residing at Dayton, in the county of Montgomery and State of Ohio, have invented certain new and useful Improvements in Clutch and Braking Mechanism, of which the following is a specification.

This invention relates to new and useful improvements in clutch and braking mechanism.

The principal object of our invention is to provide for automotive and other machines or devices, a clutch and braking mechanism that is simple in construction and efficient in operation. When our device is used as a clutch, it enables the driving part to gradually, easily and firmly engage the one at rest, to start and thereafter rotate it at the same rate of speed; and when our device is used as a brake, it will effectively stop the moving part with a minimum of friction. It provides an inexpensive and effective substitute for all forms of frictional brake lining, and when used as a clutch, our device has the advantage of simplicity, durability and efficiency of operation.

Other important and incidental objects will be brought out in the following specification, and particularly set forth in the subjoined claims.

Figure 1:
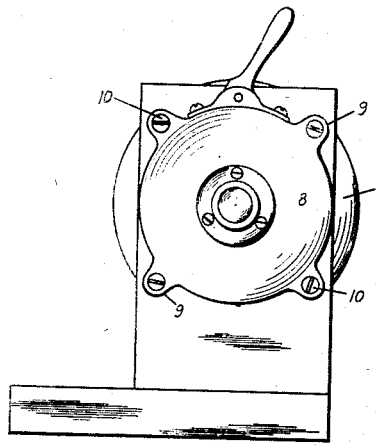
Figure 4:
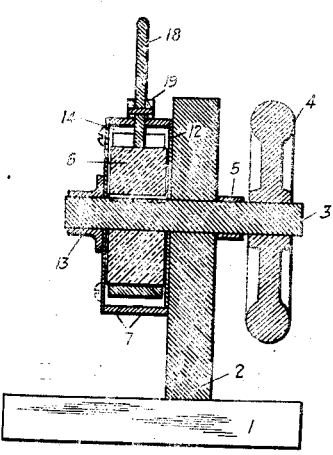
Figure 3:
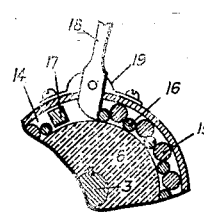
Figure 2:
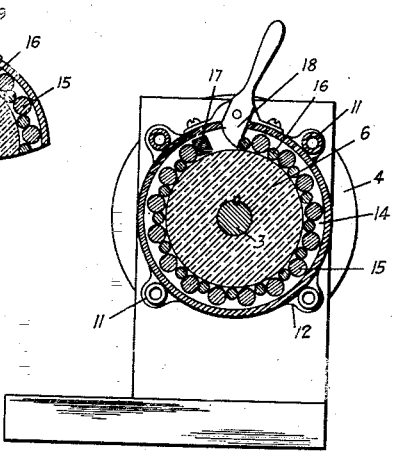

The preferred form of embodiment of our invention is illustrated in the accompanying drawings, of which Figure 1 is a side elevational view of the housing and support employed for our improved clutch and braking mechanism, for the purpose of explaining its construction and operation. Fig. 2 is a view similar to that shown in Fig. 1, with the exception that the cover plate of the clutch housing has been removed to reveal the clutch or braking mechanism. Fig. 3 is a detail view of the clutch housing, partly broken away, showing the clutch mechanism in an engaging position. And Fig. 4 is a cross sectional view taken through the device and the wheel which is operated thereby.

Throughout the specification and drawings, similar reference characters denote corresponding parts.

In a detailed description of the preferred form of embodiment of our invention, the numeral 1 designates a base and 2 a standard through a horizontal bore in the upper portion of which there projects a shaft 3, While we have shown the shaft 3 as one that is journaled in the aforementioned standard, it might be the transmission shaft of an automobile or other machine, that it is desired to start in motion, or the axle of a vehicle or other movable object, whose motion it is desired to retard. Fast on the outer end of the shaft 3 is a wheel 4 for the purpose of illustrating how the fly wheel of an engine or traction wheel of a vehicle or other device, may be started or stopped by our improved mechanism. A collar 5 is loosely fitted on the shaft 3 to hold the wheel 4 at a short distance from the standard 2.

On the opposite side of the standard 2, there is fixedly secured to the shaft 3, a cylindrical member 6 which freely turns in a cylindrical housing 7 attached to the standard 2. The outer portion of this housing is adapted to be closed by a cover plate 8 provided with ears 9 through which screws 10 are adapted to be projected. The latter are adapted to be screwed into tubular elements 11 on a base plate 12 that is in turn secured to the standard 3. Secured to the middle portion of the cover plate 8 is a bushing 13 adapted to receive the outer end of the shaft 3.

Disposed within the annular space 14 between the outer periphery of the cylindrical member 6 and the inner surface of the housing 7 is a series of large rollers 15 and small rollers 16 alternately arranged around the periphery of said cylindrical member between a fixed stop 17, and the lower end of a lever 18 pivotally secured to a fulcrum member 19 secured to the top portion of the housing 7. These rollers, or equivalent elements, which may be of the same size, are adapted to be moved into firm engagement with one another, and the outer periphery of the cylindrical member 6 and inner surface of the housing 7, to effect or obtain the result now to be described.

Referring to Fig. 2, it will be observed that the rollers 15 and 16 are not in tight engagement with themselves or their restraining walls, whereby the cylindrical member 6 will be permitted a free movement within the housing 7. However, when the outer end of the lever 18 is moved to the left, its lower end, which projects through a recess in the housing 7, will engage the roller nearest said end, forcing it and the other rollers to the right. Now, since the circumferential movement of said rollers is restrained beyond a fixed point by the stop 17, a further movement of the lever 18 will cause the rollers of one size, to force those of the other size tightly against the outer periphery of the cylindrical member 6, to retard its rotatory movement. In other words, the rollers will be wedged in the gradually decreasing space between the lower end of the lever 18 and the fixed stop 17, or its equivalent. The engagement between the rollers and their restraining walls is practically noiseless, easy and firm, with a minimum of friction, making the device valuable as either a clutch or a brake.

Having described our invention, we claim:

1. In a device of the type described, the combination with a cylindrical member, of a sleeve surrounding said member, rollers disposed in the space between said member and sleeve, a fixed stop for said rollers in the space between said cylindrical member and sleeve, and a lever pivoted in the latter for forcing said rollers against said stop, the outer periphery of said cylindrical member and the inner periphery of the sleeve, to effect a tight engagement between the latter and the cylindrical member.

2. In a device of the type described, the combination with a rotatable cylindrical member, of a cylindrical housing for said member, a series of rollers of one size, and a series of rollers of another size, alternately disposed in the space between said cylindrical member and housing, a fixed stop for the rollers in said space, and a lever pivoted in said housing, adapted to wedge said rollers in the space between said cylindrical member and housing, to retard the rotatory movement of said cylindrical member.

In witness whereof we have hereunto set our hands this 15th day of May, 1919.

JOHN C. KELLY.
CURWIN ENSCOE.

Witness:
HOWARD S. SMITH.